(12) United States Patent
Kahler et al.

(10) Patent No.: US 6,691,700 B2
(45) Date of Patent: Feb. 17, 2004

(54) GAS GRILL BURNER APPARATUS

(75) Inventors: Andrew W. Kahler, Fortson, GA (US); Chris Cantrell, Midland, GA (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 10/407,369

(22) Filed: Apr. 4, 2003

(65) Prior Publication Data

US 2003/0188732 A1 Oct. 9, 2003

Related U.S. Application Data

(60) Provisional application No. 60/370,966, filed on Apr. 8, 2002.

(51) Int. Cl.[7] .................................. A47J 37/00
(52) U.S. Cl. ..................... 126/41 R; 126/39 K; 126/447
(58) Field of Search ............... 126/41 R, 9 R, 126/39 R, 39 J, 39 K; 431/350, 354; 239/288, 288.3, 288.5, 505, 520; 99/401, 444–450, 400

(56) References Cited

U.S. PATENT DOCUMENTS

| | | | | |
|---|---|---|---|---|
| 4,561,419 A | * | 12/1985 | Koziol | 126/41 R |
| 4,899,724 A | * | 2/1990 | Kuechler | 126/41 R |
| 5,706,797 A | * | 1/1998 | Moore et al. | 126/41 R |
| 6,176,173 B1 | * | 1/2001 | Holbrook et al. | 99/401 |
| 6,279,566 B1 | * | 8/2001 | Craven, Jr. | 126/41 R |

* cited by examiner

Primary Examiner—James C. Yeung
(74) Attorney, Agent, or Firm—James W. Kayden; Thomas, Kayden, Horstemeyer & Risley, LLP

(57) ABSTRACT

A gas grill burner apparatus is provided that fits within barbecue grill cooking chambers of varied configurations and sizes. In accordance with one embodiment of the present invention, a gas grill burner apparatus includes a center manifold configured to form two hollow gas tubes, the gas tubes being substantially parallel. The gas grill burner apparatus also includes first and second C-shaped hollow gas tube end portions slideably engaged within opposing ends of the parallel hollow gas tubes. The apparatus further includes a center grease tent mounted atop the center manifold and first and second telescoping grease tent members mated with the center grease tent. The telescoping grease tent members are configured to move laterally with the first and second gas tube end portions.

12 Claims, 3 Drawing Sheets

GAS GRILL BURNER APPARATUS

CROSS REFERENCE TO RELATED APPLICATIONS

This application claims the benefit of U.S. Provisional Patent Application serial No. 60/370,966 dated Apr. 8, 2002, which is incorporated herein by reference in its entirety.

FIELD OF THE INVENTION

The invention is generally related to barbecue grills, and, more particularly, is related to an adjustable gas grill burner apparatus.

BACKGROUND OF THE INVENTION

Gas-fired barbecue grills typically incorporate one or more gas burners, which are mounted within the interior of a cooking chamber. The gas burners typically are mounted in a lower portion of the cooking chamber below a cooking surface, such as a grill or grate, and are provided with a flow of gas, such as from an LP gas tank, for providing heat for cooking food items placed upon the cooking surface.

Typical gas burners are formed of metal and are configured with an interior chamber which is adapted to receive a flow of gas from one or more gas feed lines. The interior chamber of a gas burner is adapted to distribute the flow of gas from the gas feed lines about the gas burner so that the gas may be distributed and expelled through a series of gas orifices.

Typically, the gas orifices are formed about a periphery of the gas burner so as to provide a relatively large flame pattern. In some embodiments, the gas orifices are downwardly directed and typically are formed along a lower portion of the outer periphery of the gas burner. Gas burners incorporating these downwardly-directed gas orifices also typically incorporate a protruding edge or flange which is positioned above the gas orifices and which overhangs the gas orifices so that drippings exuded from food items being cooked on the cooking surface of the grill disposed above the burners, and other materials, do not fall or drain into the gas orifices.

In other embodiments, gas burners have incorporated gas orifices about an upper surface of the gas burner. This particular configuration of the gas burners typically requires the use of a cover or shield which is disposed between the gas orifices and the cooking surface for preventing drippings and other materials from falling or draining into the gas orifices, and thereby potentially clogging the gas orifices.

Typical gas burners and shields are a fixed size. An array of different barbecue grills; however, typically are not configured with cooking chambers of standard size or shape. The size and configuration of the cooking chamber typically varies from one barbecue grill to another. As such, manufacturers of barbecue grills must either manufacture or obtain a variety of gas burners and shields each designed specifically for the grill in which it will be installed. This results in higher manufacturing and inventory costs.

Further, an original gas burner installed in a grill at the time of purchase can malfunction and need to be replaced in order to sustain the useful life of the grill. Currently, in order to replace a gas burner, one must obtain a specific gas burner designed to fit in the particular barbecue grill needing the replacement burner. As such, the proper replacement burner may be difficult to find and more costly to purchase than necessary. Such a lack of standardized sized and shaped cooking chambers has led to the expenditure of considerable funds in designing, producing, and maintaining inventories of numerous sizes and configurations of gas burners.

U.S. Pat. No. 4,561,419 to Koziol, incorporated by reference herein in its entirety, discloses an adjustable burner assembly for a gas grill. The Koziol burner assembly includes a gas intake member in communication with an adjustable-length bar burner. The bar burner includes telescoping body members that can extend laterally to fit a variety of gas grill base portions. A drawback of this type of design is that heat is not evenly distributed throughout the base of the grill portion. The bar burner structure has a narrow footprint relative to the bases of many gas grills. As such, heat is often concentrated outwardly of the central region of the grill atop the bar burner, but does not project outwardly far enough and does not heat the central region of the grill surface.

Another drawback of the Koziol assembly is its relative difficulty in manufacturing. Generally, flat pieces of steel that are crimped together require significant effort during the manufacturing process. Furthermore, singular pieces of steel can become warped over time. Generally, tube structures are easier to manufacture and also provide extra strength to any structure.

Therefore, there is a need for improved devices and systems which address these and other shortcomings of the prior art.

SUMMARY OF THE INVENTION

In accordance with the present invention, a gas grill burner apparatus is provided that fits within barbecue grill cooking chambers of varied configurations and sizes. In accordance with one embodiment of the present invention, a gas grill burner apparatus includes a center manifold configured to form two hollow gas tubes. The gas tubes are substantially parallel. The gas grill burner apparatus also includes first and second C-shaped hollow gas tube end portions slideably engaged within opposing ends of the parallel hollow gas tubes. The apparatus further includes a center grease tent mounted atop the center manifold and first and second telescoping grease tent members mated with the center grease tent. The telescoping grease tent members are configured to move laterally with the first and second gas tubes end portions.

Another embodiment of the present invention may be construed to be a gas grill that includes an adjustable gas grill burner apparatus. The adjustable gas grill burner apparatus includes a center manifold configured to form two hollow gas tubes. The gas tubes are substantially parallel. The burner apparatus also includes first and second C-shaped hollow gas tubes end portions slideably engaged within opposing ends of the parallel hollow gas tubes. The burner apparatus further includes a center grease tent mounted atop the center manifold and first and second telescoping grease tent members mated with the center grease tent. The telescoping grease tent members are configured to move laterally with the first and second gas tubes end portions. The gas grill also includes at least a first gas feed line for providing gas to the hollow gas tubes.

Yet another embodiment of the present invention may be construed to be an adjustable gas grill burner apparatus. The apparatus includes a continuous hollow gas tube burner formed in an elongated ovular shape. The apparatus also includes a grease tent. The continuous hollow gas tube burner includes a center manifold and first and second C-shaped telescoping end portion. The grease tent includes a center tent member mounted above the center manifold and first and second end members mated with the center tent member and mounted to the first and second C-shaped telescoping end portions. The first and second end members extend with the first and second C-shaped telescoping end portions.

Other systems, features, and advantages of the present invention will be or become apparent to one with skill in the art upon examination of the following drawings and detailed description. It is intended that all such additional systems, features, and advantages be included within this description, be within the scope of the present invention, and be protected by the accompanying claims.

DETAILED DESCRIPTION

Figure 1A:
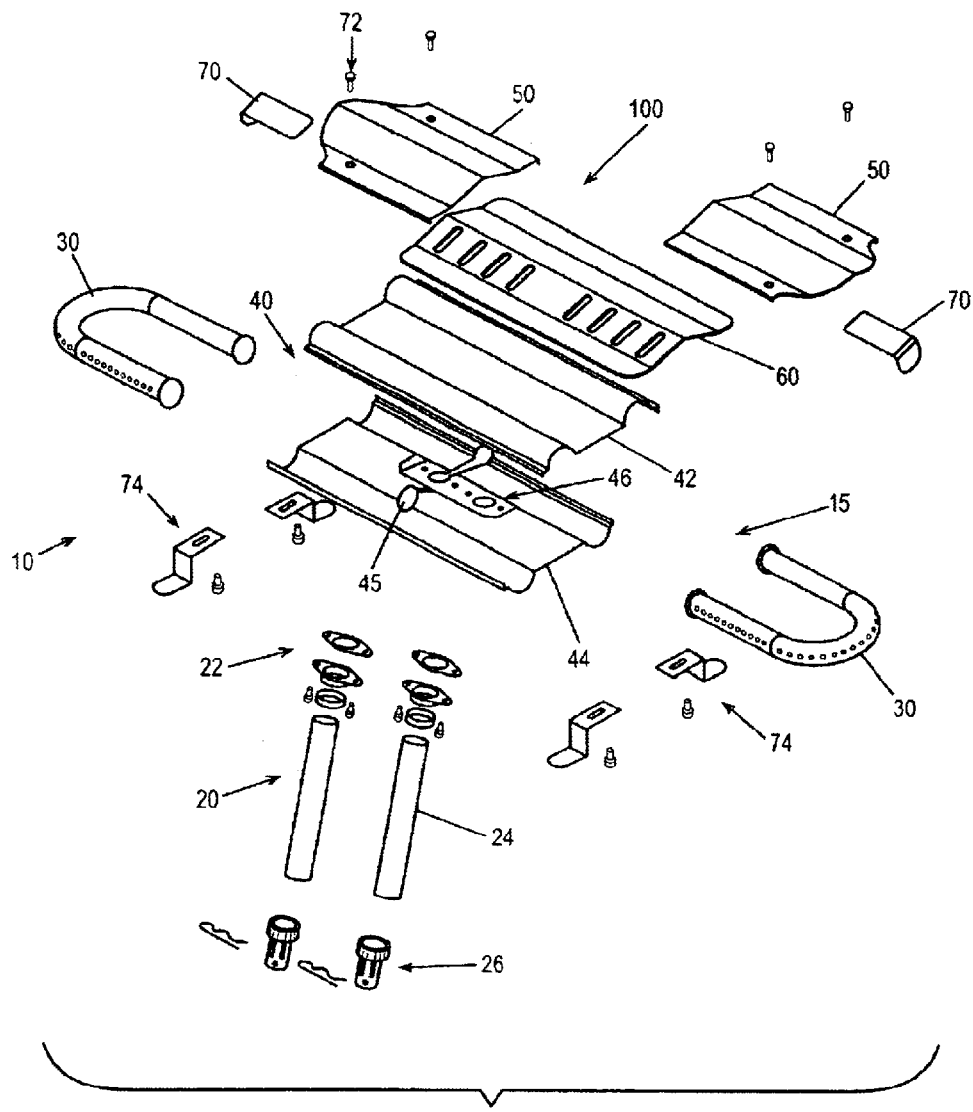
FIG. 1A illustrates an exploded view of an embodiment of a gas grill burner apparatus of the present invention.

Referring first to FIG. 1A, an exploded view of an embodiment of a gas grill burner apparatus 10 is illustrated. The burner apparatus 10 may be adjusted in size to fit within a variety of gas grills. In this embodiment, the length of the burner apparatus 10 may be adjusted. However, in other embodiments both length and width may be adjusted to fit most gas grills.

A center manifold 40 and mating C-shaped tube end portions 30 form a closed-loop burner 15 arranged in a substantially elongated ovular shape. The burner 15 has a substantially circular cross-sectional configuration defining a hollow internal, tube-like, chamber. A plurality of orifices are disposed through the tube of the gas burner 15, such as around the outside periphery. It should be understood, however, that the orifices can be arranged in any suitable manner. It should also be understood that the adjustable gas burner apparatus 10 can comprise any suitable cross-section configuration and be arranged in any suitable substantially continuous shape. The gas burner 15 can comprise any heat-tolerant, rust-resistant material, such as stainless steel, or the like.

The center manifold 40 forms a pair of center portions of the continuous burner 15, arranged substantially parallel to each other and spaced apart from each other. Each center portion is a substantially elongated linear tube having opposing ends. The center manifold 40 is formed of an upper manifold 42 and a lower manifold 44 coupled together. Formed in the lower manifold 44 are two port holes 46 for coupling to two gas feed lines 20. Two baffles 45 are welded into place in the lower manifold 44 to divide the gas burner 15 into left and right burners. Accordingly, either one side or both sides of the burner may be used at any given moment. Two gas feed lines 20 are desired in order to provide split control of the burner 15.

The C-shaped end portions 30 are disposed toward opposing ends of the pair of center portions. The ends of each end portion 30 are fixed one to each of the pair of center portions, thereby providing continuous fluid communication between the center portions and the end portions 30. As illustrated this gas burner apparatus 10 comprises a substantially elongated oval shape. It should be understood, however, that the gas burner apparatus 10 can comprise any suitable shape, such as a rectangle, square, or the like.

The end portions 30 are fixed to the center portions in a slidable or telescoping manner either directly or with additional extension members (not shown) slidably disposed between the center portions and the end portions 30. In an embodiment where no extension member is included, the gas burner apparatus 10 is adjustable between a closed position (See FIG. 1B) and an open position (See FIG. 1C). The gas burner apparatus 10 may be adjusted to positions intermediate the two extremes illustrated in FIG. 1B and FIG. 1C. The end portions 30 can be moved toward and away from each other to decrease and increase the length L, respectively. It should be noted that the same technology is applicable to altering the width W of the burner apparatus 10, by providing telescoping function for the end portions 30 and the corresponding burner tent 100.

Two gas feed lines 20 are provided in fluid communication with and extend from the two port holes 46 in the lower manifold 44. The two port holes 46, although illustrated generally in the center of the lower manifold 44, may be positioned anywhere along the lower manifold 44 as long as fluid communication is provided to the center portions of the burner 15. The gas feed lines 20 can be connected to the lower manifold 44 in any suitable manner, such as being press fit, welded, or the like.

Each gas feed line 20 comprises an elongated venturi tube 24 having a receiving end and a delivery end. The receiving end of the venturi tube 24 is arranged and configured to receive a flow of gas fuel from a fuel source, such as an LP tank (not shown), or the like, through aspirator 26, which is firmly crimped into place. The delivery end of the venturi tube 24 may be coupled to the lower manifold 44 with a venturi gasket and flange structure 22 as is well known in the art. It should be noted that although a pair of venturi tubes 24 is illustrated, the continuous gas grill burner apparatus 10 of the present invention can comprise any suitable number of venturi tubes 24 without departing from the spirit of the invention.

The gas grill burner apparatus 10 also includes a grease tent 100 disposed above and along the length L and width W of the continuous burner 15. It is preferable that the grease tent 100 is defined by a length L substantially corresponding to the length L of the gas burner 15 and a width W substantially corresponding to the width W of the gas burner 15. The grease tent 100 comprises multiple members, such as a center member 60 and a pair of end members 50. The end members 50 are disposed toward opposing ends of the center member 60 and are substantially linearly aligned therewith. The end members 50 are fixed to the center member 60 in a slidable or telescoping manner. The end members 50 are movable between a closed position, where a substantial portion of the center member 60 is covered (FIG. 1B) and an expanded position, where a substantial portion of the center member 60 is exposed (FIG. 1C). One or both of the end members 50 can be slidably moved along the center member 60 in order to alter the length L of the grease tent 100. It should be also noted that although a pair of movable end members 60 is disclosed herein, the grease tent 100 can comprise only one movable end member 50 without departing from the spirit of the present invention.

The grease tent 100 is configured such that grease drippings fall atop the grease tent 100 and run off the sides of the tent 100. In this manner, the burner 15 remains protected from the falling grease thereby preventing the gas orifices of the burner 15 from getting clogged, as well as reducing the possibility of a grease fire.

The side members 50 of the grease tent 100 may be coupled to the end portions 30 of the burner 15 with rivets 72. In this manner, the side tent members 50 may be moved concurrently with the end portions 30 of the burner 15. End stops 70 may be included and coupled to the side tent members 50. The end stops 70 may be used to position the side tent members 50 and end portions 30 about the gas chamber of the grill.

Burner feet 74 may also be included in the burner apparatus 10 and may be coupled to the end portions 30 or the lower manifold 44. The burner feet 74 may be installed, as needed, by the user.

In use, the gas grill burner apparatus 10 can be positioned in a cooking chamber 200 of a gas barbecue grill regardless of size or configuration of the cooking chamber. The end portions 30 and end members 50 of the gas burner 15 and grease tent 100, respectively, are moved laterally relative to the center manifold 40 and center tent member 60, respectively, to adjust the size of the gas grill burner apparatus 15.

The apparatus 10 is reduced in length L to a measurement that is readily received by the cooking chamber 200 of the gas grill. The apparatus 10 is disposed in the cooking chamber 200 of the barbecue gas grill. The burner apparatus 10 is disposed in the cooking such that the apex of the grease tent 100 is pointing upward and the gas feed line(s) 20 is extending downward. The length of the apparatus 10 is expanded to a measurement substantially corresponding to the length of the cooking chamber. The aspirator(s) 26 of the gas feed line(s) 20 is connected to a gas fuel source (not shown), such as an LP tank, or the like. Upon turning on the flow of gas to the gas feed line(s) 20, gas flows through the gas burner 15 and out the orifices disposed throughout. The gas is ignited with flame or a spark and the burner apparatus 10 produces heat for cooking.

Figure 1B:
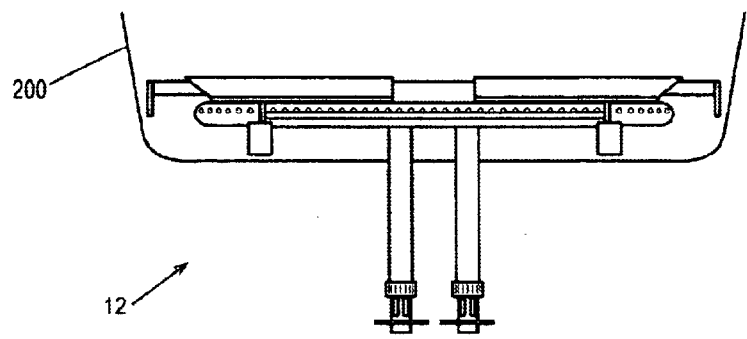
FIG. 1B illustrates a front view of the gas grill burner apparatus of FIG. 1A disposed in a closed position.
Figure 1C:
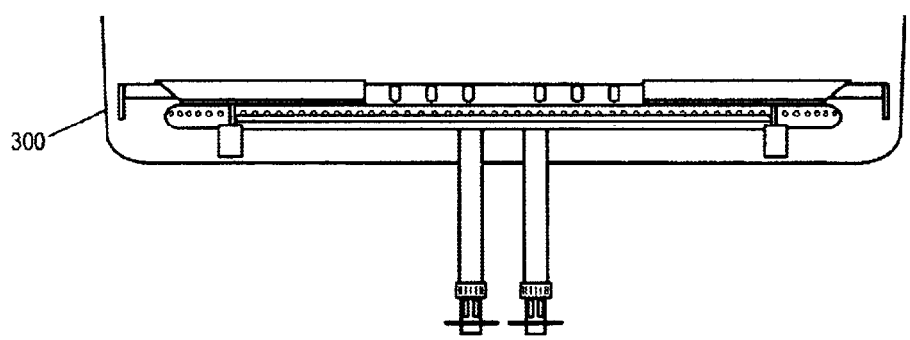
FIG. 1C illustrates a front view of the gas grill burner apparatus illustrated in FIG. 1A disposed in an open position.

FIG. 1B illustrates a front view of the continuous gas grill burner apparatus 10 of FIG. 1A disposed in a closed position 12. In this manner, the burner apparatus 10 may be placed in a first, smaller gas grill chamber 200. As mentioned, the end stops 70 may be positioned up against or relatively close to the side walls of the gas grill chamber 200. Furthermore, the burner feet 74 may rest atop the base of the gas grill chamber 200.

FIG. 1C illustrates a front view of the continuous gas grill burner apparatus 10 illustrated in FIG. 1A disposed in an open position 14. The burner apparatus 10 may be placed in a second, relatively larger, gas grill chamber 300. It should be understood that the end portions 30 of the burner's need not be extended symmetrically. For example, the left end portions 30 may be extended more so than the right end portion 30, or vice-versa.

Figure 2:
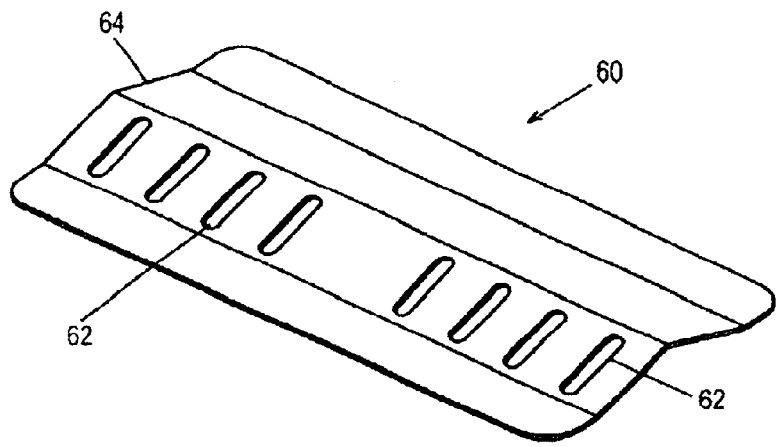
FIG. 2 illustrates a perspective view of a center grease tent of the gas grill burner of FIG. 1A.

FIG. 2 illustrates a perspective view of a center grease tent member 60 of the gas grill burner apparatus 10 of FIG. 1A. In this embodiment, the grease tent 100 is formed in an A-frame cross-sectional shape. The grease tent 100 is positioned over the gas burner 15 in order to prevent grease from cooking food disposed above the gas burner 15 on the cooking surface (not shown) from dripping on the gas burners 15. It should be noted that although the A-frame configuration grease tent 100 is illustrated herein, the grease tent 100 can comprise any suitable configuration. The grease tent 100 preferably comprises a heat-tolerant, rust-resistant material, such as stainless steel, or the like.

The center grease tent member 60 also includes a plurality of detents 62. In this embodiment, the center grease tent member 60 includes eight detents 62; four on each lateral side of the center member 60. The detents 62 may be used as reference markers for the side tent members 50, so as to evenly adjust the length of the burner apparatus 10. FIG. 1B and FIG. 1C best illustrate the functionality of the detents 62. In the closed position illustrated in FIG. 1B, the side members 50 are at the center-most detents 62. In the open position illustrated in FIG. 1C, the side members 50 are extended to the outermost detents 62. More or less than eight detents 62 could be formed in the center tent member 60. The detents 62 are simply depressions formed in the center tent member 60 and have solid surfaces.

Figure 3:
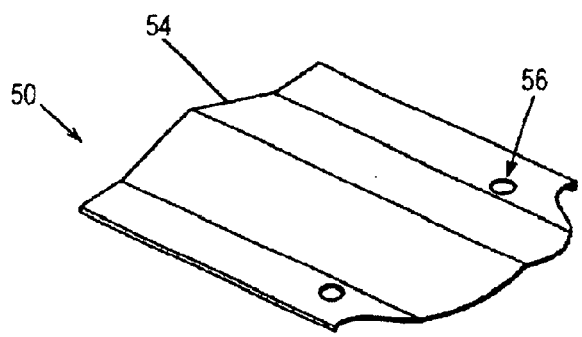
FIG. 3 illustrates a perspective view of a side grease tent member of the gas grill burner apparatus of FIG. 1A.

FIG. 3 illustrates a perspective view of a side grease tent member 50 of the gas grill burner apparatus 10 of FIG. 1A. As noted with regard to the center tent member 60 of FIG. 2, the grease tent 100 is formed in an A-frame cross-sectional shape. An apex 54 is formed at a lateral center line to provide a graded slope for grease run-off. Two holes 56 are provided for the rivets 72 (See FIG. 1A). Although not shown, an end stop 70 may be welded to the end of the side member 50.

Figure 4:
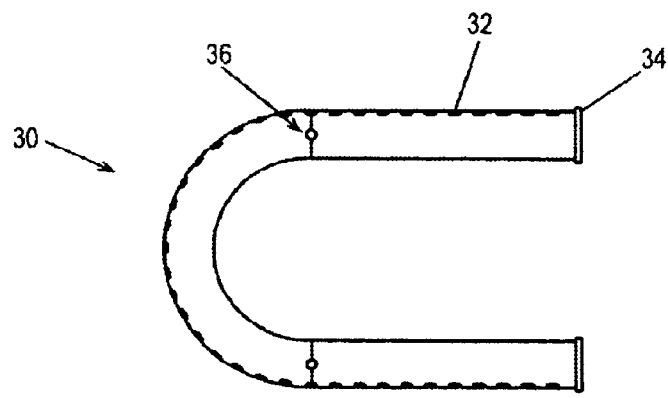
FIG. 4 illustrates a top view of a C-shaped hollow tube end portion of the gas grill burner apparatus of FIG. 1A.

FIG. 4 illustrates a top view of a C-shaped hollow tube end portion 30 of the gas grill burner apparatus 10 of FIG. 1A. Gas orifices 32 are provided around the periphery of the end portion 30. In this embodiment, the orifices 32 are positioned in a slightly upward direction so as to direct the flames directly upward. In other embodiments, the orifices 32 may be positioned differently, for example in a slightly downward direction.

Two holes 36 are provided on the top of the end portion 30 for receiving rivets 72 (See FIG. 1A). The holes 36 are positioned to align with the holes 56 of the side tent members 50. The side tent members 50 are aligned such that they provide complete cover for the end portions 30. Holes for the burner feet 74 (See FIG. 1A) may also be provided on the underside of the end portion 30.

The ends 34 of the end portion 30 may be outwardly swaged so as to meet with the ends of the center manifold 40, which are inwardly swaged. In this manner, the tube ends 34 prevent the user from extending the end portion 30 beyond the ends of the center manifold 40. Furthermore, the swaged ends 34 of the burner end portion 30 provide for a better seal to prevent gas leakage. The end portion 30 is formed such that the ends 34 are relatively flush with the interior of the hollow tubes of the center manifold 40. It will be appreciated that the seal need not be airtight, but rather sufficient enough to avoid significant gas leakage. Any gas that may leak through the seal will burn within the tube.

Once heated, the metal of the end portions 30 and the manifold 40 may oxidize. This process may substantially lock the end portions 30 in place. However, once a user has positioned the burner apparatus 10 in place, it would seem unlikely to adjust the burner apparatus 10 after use. A significant amount of force, such as with a hammer or some other tool may be utilized to break the lock formed between the end portion 30 and the center manifold 40.

The foregoing description has been presented for purposes of illustration and description. It is not intended to be exhaustive or to limit the invention to the precise forms disclosed. Obvious modifications or variations are possible in light of the above teachings. For example, a third, center, hollow gas tube may be formed in the center manifold 40. In this manner, the C-shaped end portions 30 would be configured with an extra tube, to form a fork-like shape. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are intended to be included herein within the scope of this disclosure and the present invention.

The following is claimed:

1. A gas grill burner apparatus, comprising:
   a center manifold configured to form two hollow gas tubes, said gas tubes being substantially parallel;
   first and second C-shaped hollow gas tube end portions slideably engaged within opposing ends of said parallel hollow gas tubes;
   a center grease tent mounted atop said center manifold; and
   first and second telescoping grease tent members mated with said center grease tent, said telescoping grease tent members being configured to move laterally with said first and second gas tube end portions.

2. The gas grill burner apparatus of claim 1, wherein said center manifold comprises:
   a lower manifold; and
   an upper manifold hemmed to said lower manifold.

3. The gas grill burner apparatus of claim 2, further comprising:
   at least a first gas feed line coupled with said lower manifold and configured to provide gas to said hollow gas tubes.

4. The gas grill burner apparatus of claim 1, wherein said hollow gas tubes comprise a plurality of orifices for emitting gas around the burner.

5. A gas grill comprising:
   an adjustable gas grill burner apparatus, comprising:
      a center manifold configured to form two hollow gas tubes, said gas tubes being substantially parallel;
      first and second C-shaped hollow gas tube end portions slideably engaged within opposing ends of said parallel hollow gas tubes;
      a center grease tent mounted atop said center manifold; and
      first and second telescoping grease tent members mated with said center grease tent, said telescoping grease tent members being configured to move laterally with said first and second gas tube end portions; and
   at least a first gas feed line for providing gas to said hollow gas tubes.

6. The gas grill burner of claim 5, wherein said center manifold comprises:
   a lower manifold; and
   an upper manifold hemmed to said lower manifold.

7. The gas grill burner of claim 5, wherein said hollow gas tubes comprise a plurality of orifices for emitting gas around the burner.

8. An adjustable gas grill burner apparatus, comprising:
   a continuous hollow gas tube burner formed in an elongated ovular shape, said burner comprising:
      a center manifold; and
      first and second C-shaped telescoping end portions;
   a grease tent comprising:
      a center tent member mounted above said center manifold; and
      first and second end members mated with said center tent member and mounted to said first and second C-shaped telescoping end portions, such that said first and second end members extend with said first and second C-shaped telescoping end portions.

9. The burner apparatus of claim 8, wherein said center manifold comprises:
   an upper manifold; and
   a lower manifold mounted to said upper manifold.

10. The burner apparatus of claim 9, further comprising:
    at least a first gas feed line for providing gas to said burner.

11. The burner apparatus of claim 10, wherein said lower manifold further comprises:
    at least a first port hole for providing fluid communication from said at least first gas feed line to said burner.

12. The burner apparatus of claim 10, wherein said lower manifold further comprises:
    baffles mounted in said continuous hollow gas tube burner and configured to divide said burner.

* * * * *